United States Patent [19]

Poklemba et al.

[11] Patent Number: 5,052,027
[45] Date of Patent: Sep. 24, 1991

[54] PROGRAMMABLE NOISE BANDWIDTH REDUCTION BY MEANS OF DIGITAL AVERAGING

[75] Inventors: John J. Poklemba, Frederick; Chester J. Wolejsza; James R. Thomas, both of Montgomery, all of Md.

[73] Assignee: Comsat Laboratories, Clarksburg, Md.

[21] Appl. No.: 457,027

[22] Filed: Dec. 22, 1989

[51] Int. Cl.[5] .............................................. H04B 1/10
[52] U.S. Cl. ............................... 375/103; 364/724.01; 364/734; 455/296; 455/303; 455/306; 455/307
[58] Field of Search .............. 455/303, 295, 296, 307, 455/306, 312; 375/99, 102, 103, 104; 364/724.01, 724.1, 734

[56] References Cited

U.S. PATENT DOCUMENTS 4,563,637 1/1986 De Bortoli et al.
4,583,184 4/1986 Murase ................................. 364/734
4,714,929 12/1987 Davidson ........................ 364/724.01
4,727,504 2/1988 Van Broekhoven ........... 364/724.01

Primary Examiner—Reinhard J. Eisenzopf
Assistant Examiner—Chi H. Pham
Attorney, Agent, or Firm—Sughrue, Mion, Zinn Macpeak & Seas

[57] ABSTRACT

Predetection noise bandwidth reduction is effected by a pre-averager capable of digitally averaging the samples of an input data signal over a single symbol, the averaging interval being defined by the input sampling rate divided by the output sampling rate. As the averaged sample is clocked to a suitable detector at a much slower rate than the input signal sampling rate the noise bandwidth at the input to the detector is reduced, the input to the detector having an improved signal to noise ratio as a result of the averaging process, and the rate at which such subsequent processing must operate is correspondingly reduced. The pre-averager may form a data filter when the output sampling rate is reduced to one sample per symbol of received data.

20 Claims, 6 Drawing Sheets

PROGRAMMABLE NOISE BANDWIDTH REDUCTION BY MEANS OF DIGITAL AVERAGING

FIELD OF THE INVENTION

The invention is in the field of signal demodulation and has application in information transmission systems where pre-demodulation, that is, pre-detection, noise bandwidth reduction is advantageous to increase the signal-to-noise (S/N) ratio prior to signal detection.

BACKGROUND OF THE INVENTION

Modulated signals, carrying information such as video, data, music and speech are generally contaminated by noise. Efficient demodulation requires distinguishing the information from the noise.

The demodulation process includes several steps. The receiver may receive, at its antenna, an information signal modulated on a radio frequency (RF) carrier. The signal may then undergo frequency conversion to the intermediate frequency (IF) band. The information signal, at baseband, is recovered from the IF signal by a suitable detector. Considering, for example, a conventional receiver in a variable rate digital data transmission system, the IF signal, produced from a received RF signal by subjecting the RF signal to a mixing or filtering process, is subsequently applied to a data detector for recovering, at baseband, the information content of the input signal. As the system must be responsive to a variable rate signal, the IF bandwidth must be broad enough to process the highest expected data rate, although at any point in time the receiver may be detecting a lower rate and thus narrower band signal. As the noise bandwidth is not limited to the frequency spectrum, that is, bandwidth, of the received signals, the bandwidth of the receiver'front-end, that is, prior to detection, must be scaled with the received signalling rate to prevent noise overload, signal suppression, and distortion in subsequent digital processing stages. To effect this scaling it is conventional to use some type of filter switching mechanism limiting the IF bandwidth based on the received signalling rate.

A conventional filter switching arrangement for limiting the noise bandwidth at a receiver front end is illustrated in FIG. 1. This arrangement may be used in a receiver of a digital data transmission system to select a bandwidth at IF sufficient to pass data signals transmitted at a selected one of several data rates, while suppressing noise outside that bandwidth.

The FIG. 1 arrangement includes an input terminal 6 receiving the incoming modulated signal and noise at IF. The input terminal 6 is connected to a commutator 4 of a rotary switch 2. The switch 2 has a number of fixed contacts $8_1$—$8_n$ each selectively connected to the commutator 4 through rotation of the commutator. Each fixed contact $8_1$—$8_n$ is electrically connected to a respective IF filter $10_1$—$10_n$. The center frequencies $F_1$—$F_n$ and bandwidths $BW_1$—$BW_n$ of the IF filters $10_1$—$10_n$ are selected on the basis of the data rates the receiver is designed to accept. The outputs from the IF filters are input to a power combiner 12. The output from the power combiner is an IF signal whose bandwidth is scaled to the signalling rate of the received signal, that is, somewhat greater than, but proportional to, the bandwidth of the received data or symbol rate, thereby reducing the noise bandwidth prior to data detection in a detector 14. The reduced noise bandwidth prevents noise overload, signal suppression and distortion in the latter processing stages of the detector 14.

More specifically, in operation of the conventional arrangement of FIG. 1, an RF signal, modulated by a data signal at the selected symbol rate, is converted to IF by conventional mixing or filtering and then applied to input terminal 6. One of the parallel sets of filter paths is selected by rotating commutator 4 based on the symbol rate of the data signal modulating the IF signal. The selected one of the IF filters $10_1$—$10_n$ limits the bandwidth of the IF signal prior to detection, thereby reducing the noise bandwidth which initially extends over the entire IF spectrum. This conventional arrangement suffers from several disadvantages. For example, it is expensive and cumbersome to implement, and it produces gain and phase variations from one path to another as well as from one unit to another.

If the filter responses are relatively simple, a single filter implementation with switched elements might be used instead of the plural paths of the filters. However, even in this case, the disadvantages stated above exist.

Boxcar filtering is another technique which might be used to reduce pre-detection noise. Boxcar filtering involves averaging the incoming signal, with noise reduction the expected result since noise is theoretically random. Over a period of time many random signals have substantially equal positive and negative components, and thus averaging will tend to reduce the noise component of such a signal toward zero. However, note that boxcar filtering is not applicable to digital data demodulation since with the boxcar technique averaging must be done over many symbols and the exact period of the signal to be averaged must be known.

The present invention is directed to a technique and implementing apparatus which do not experience the aforementioned disadvantages of either the conventional bandwidth switching technique or boxcar filtering technique.

SUMMARY OF THE INVENTION

An object of the invention is to reduce the predetection noise bandwidth of a modulated communication signal.

Another object of the invention is to reduce predetection noise bandwidth without expensive and cumbersome equipment.

Another object of the invention is to reduce the rate at which samples need be handled in subsequent processing.

A still further object of the invention is to reduce pre-detection noise bandwidth using averaging over a single data symbol and without prior determination of the exact signal period.

It is also an object of the invention to utilize the pre-detection averaging of the invention to form a data filter thus combining the function of noise bandwidth reduction and data shaping in a single unit.

These and other objects as will become apparent are achieved by the invention described herein with reference to the following description of the preferred embodiments. According to the invention, a pre-averager is positioned in a receiver front end for processing the input signal. Assuming the information signal to be digital data, averaging of the samples will be over a single symbol. While the invention is not limited to digital data transmission systems, for convenience it will be described hereinafter in connection with such a system since the pre-averager according to the invention may be configured as a data filter for data detection. However, the pre-averager of the invention may also be used in receivers for other types of information signals such as video, speech and music.

The pre-averager of the invention includes a digital averaging module which samples an incoming signal, converted to baseband, at least at twice the noise bandwidth determined by the single, input IF filter. The samples are averaged over a defined averaging interval, ordinarily set as a function of the input data rate, and are then clocked out of the averager at a lower output data rate. An output sampling rate of two samples per symbol has been found acceptable in the embodiment hereinafter described for noise bandwidth reduction, although other output rates may also be acceptable. When implemented as a data filter, the output rate will be reduced to one sample per symbol in the detection path as is also described hereinafter in detail. The defined averaging interval is the input sampling rate divided by the output sampling rate. The averaging technique implemented by the pre-averager of the invention permits averaging over a single symbol when used in a digital data transmission system and is not dependent on a prior knowledge of the exact signal period. It is also inexpensive and relatively simple to implement.

Significantly, the invention appears to conflict with well known sampling theory concepts in that the output sample rate of the pre-averager is typically lower than twice the input noise bandwidth, although it is never less than twice the input signal bandwidth. Further, groups of incoming samples may be replaced by a single sample which is representative of their average value. While the output sample will be slightly contaminated with aperture distortion, this may be easily compensated for by transmit side equalization, for example.

In accordance with another embodiment of the invention, the pre-averager is configured to form a data filter. An optimum data filter in digital data transmission must have two fundamental attributes. One, its frequency response should be matched to the transmitted signal spectrum. Two, its combined transmission and reception impulse response should exhibit equally spaced zero crossings so that interference does not occur in the detection of adjacent symbols. Surprisingly, a data filter approaching the optimum conditions is realized by the pre-averager of the invention when the output sampling rate is reduced to one sample per symbol in the detection path.

The pre-averager implemented data filter for the detection of asynchronous data may be constructed as two parallel paths, each containing a pre-averager. By asynchronous, we mean digital data for which the exact clock frequency and phase are unknown and must be recovered. The first of the two pre-averagers supplies a sample used for data detection, carrier phase recovery and AGC estimation. The second of the two pre-averagers provides a sample used for clock recovery. Since averaging according to the teachings of the invention produces only one output sample per symbol in each of two paths, a feature of the invention is the reuse of input samples t provide the necessary samples for data detection and clock recovery.

In all cases, the preaverager performs the function of rate reduction, that is, it reduces the rate at which subsequent circuits must operate in processing the data to a new, lower, fixed, rate. This reduces the complexity and expense of those circuits.

DETAILED DESCRIPTION OF THE PREFERRED EMBODIMENTS

According to a first embodiment of the invention an IF filter and a pre-detection digital averaging module effect noise bandwidth and rate reduction. Noise bandwidth reduction according to this invention could take place at baseband, carrier, or IF frequencies. However, it is convenient to initiate the noise bandwidth reduction at baseband and therefore, a preferred embodiment of the invention has the pre-averaging according to the invention initiated there. Also, as previously stated herein, noise bandwidth reduction may be accomplished for video, speech, music or other signals besides data signals. As the present invention is especially useful in data transmission systems, the preferred embodiment is disclosed in relation to a data transmission system. In systems other than data transmission systems, variable rate reduction might be used to narrow the signal bandwidth in response to varying noise conditions.

Figure 1:
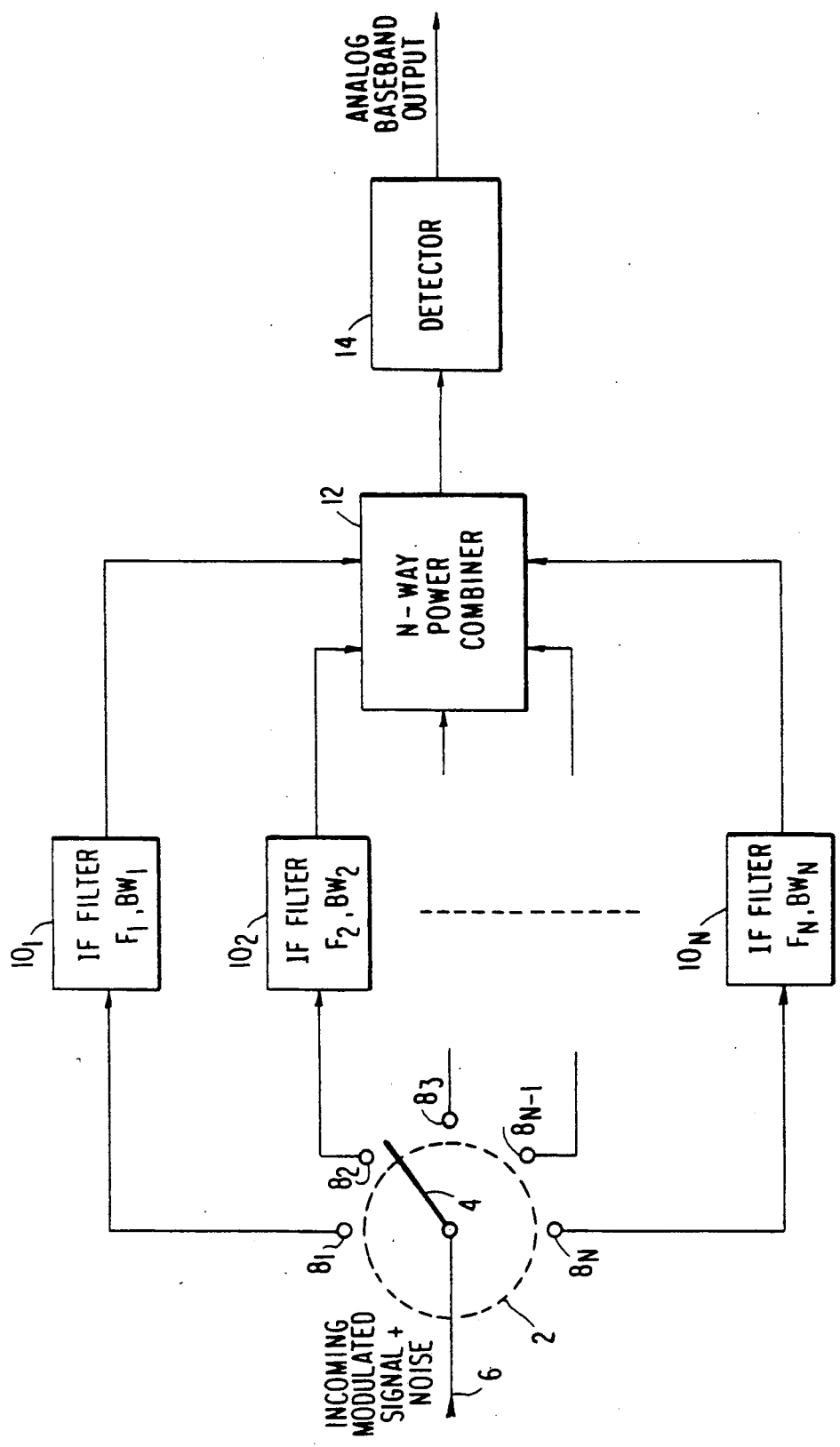
FIG. 1 illustrates a conventional bandwidth switching arrangement for reducing pre-detection noise bandwidth in variable rate data receiver.
Figure 2:
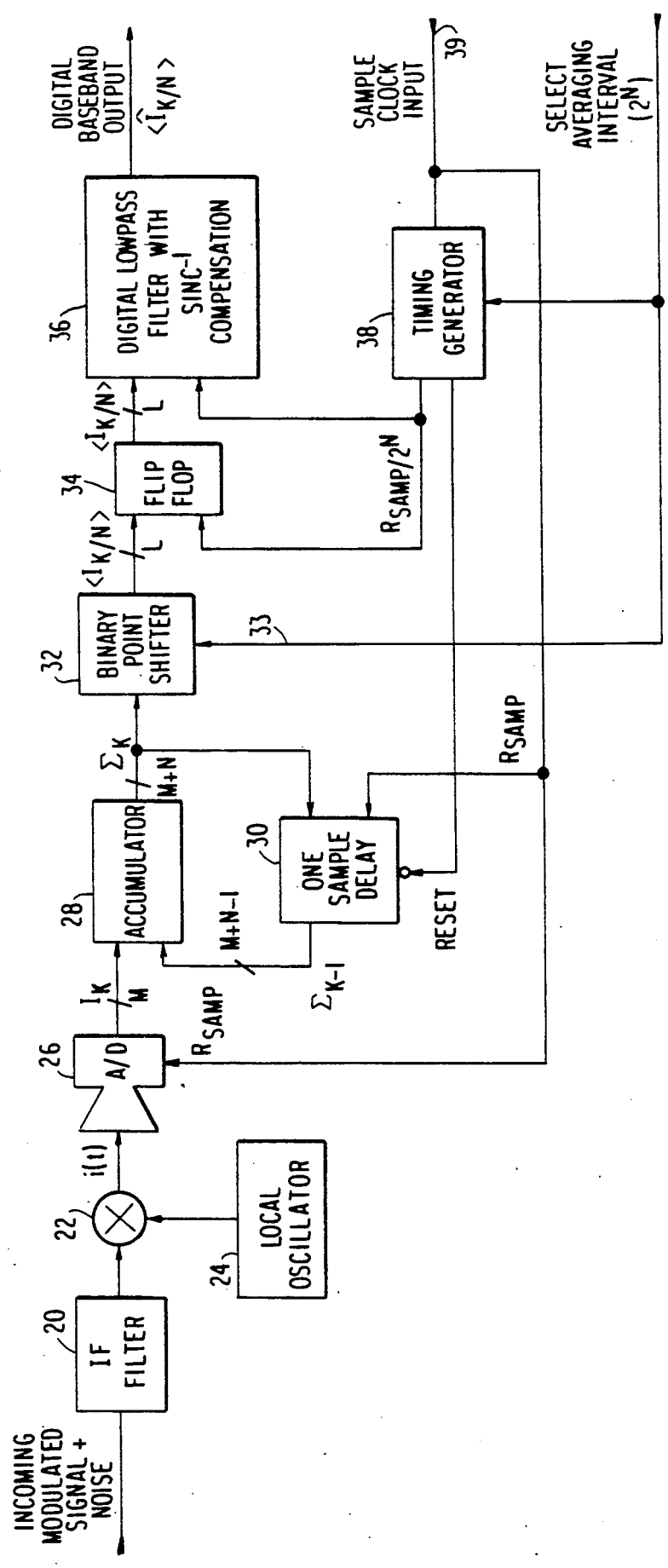
FIG. 2 illustrates a pre-detection noise bandwidth reducing pre-averager according to a first embodiment of the invention.

Referring to FIG. 2 a preferred embodiment of the pre-averager apparatus for noise bandwidth reduction includes an IF filter 20 passing the carrier modulated information signals and noise. The output from the IF filter is connected to a first input of a mixer 22. A second input to the mixer is connected to local oscillator 24 for converting the IF signal to baseband. The output from mixer 22 is an analog baseband signal i(t) which includes noise whose frequency spectrum is limited by the bandwidth of IF filter 20. The signal i(t) is input to analog-digital (A/D) converter 26 which converts signal i(t) including its noise components to digital form. The input sampling rate $R_{SAMP}$ is relatively high to prevent aliasing of noise. Typically, the input sampling rate would be at or greater than twice the noise bandwidth of the IF filter 20. The sampling rate $R_{SAMP}$ for the A/D conversion is set by a clock signal generated by a sample clock (not shown) input at terminal 39.

The output $I_k$ from the A/D converter 26 is applied to an accumulator 28, where it is added to the value, $\Sigma_k$, output from the accumulator in response to the preceding sample $I_{k-1}$. This accumulated value is fed back from the accumulator output to a second input thereto, through a one sample delay 30. The one sample delay 30 may be a latch circuit. It is to be understood that the output from A/D converter 26 is a parallel arrangement of M bits.

The delay 30 is reset by a reset pulse from a timing generator 38. The reset pulse determines the averaging interval as it sets to zero the second input to the accumulator 26 at the end of the averaging interval. The averaging interval is conveniently set to a power of two ($2^N$). An averaging interval of $2^N$ causes the accumulator output to have a bit width of M+N. Since the magnitude of the accumulator output increases by N bits as the averaging interval increases in steps of $2^N$, a binary point shifter 32 is used to select the L most significant bits where L typically=M, thereby effecting a division by N, the result then representing the average $<I_{k/N}>$ of the digital inputs $I_k$ to the accumulator over the averaging interval. The averaging interval information is input to the binary point shifter 32 at a second input thereto connected to line 33.

A latching circuit 34 receives the L bits from the binary point shifter. The latching circuit functions as a buffer to assure the presence of all L bits representing the average $<I_{k/N}>$ for further processing. The latching circuit, which may be comprised of L parallel flip flops, is clocked at the lower output sampling rate of $R_{SAMP}/2^H$ Significantly, according to the present invention, further processing of the information signal and particularly detection thereof by a suitable detector is at the lower $R_{SAMP}/2^H$ output sampling rate. FIG. 2 includes a digital lowpass filter 36 with $\sin^{-1}$ compensation. This conventional device is optional and used when further shaping of an averaged data signal is desirable.

Figure 3:
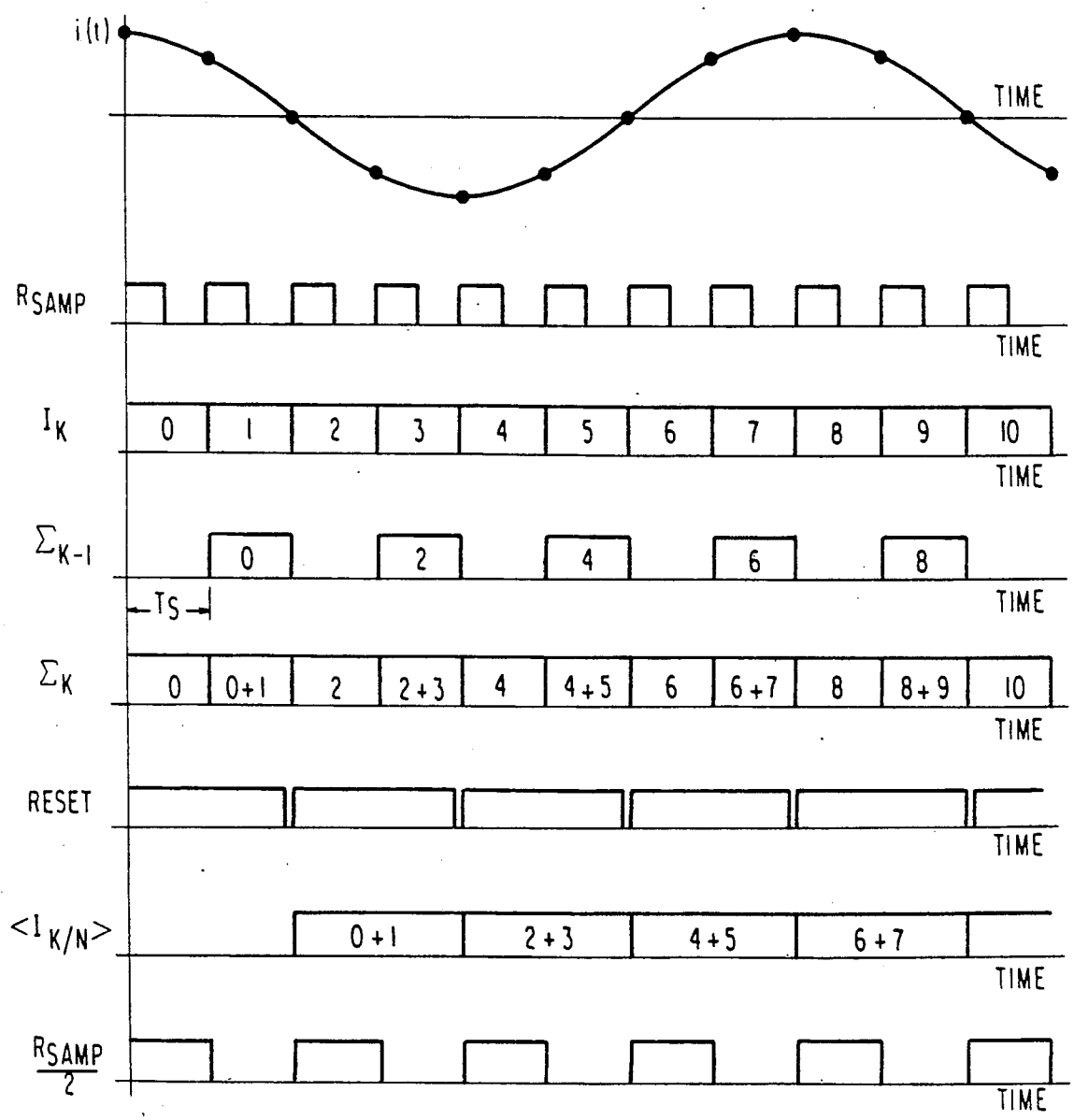
FIG. 3 is a timing diagram for illustrating the operation of the FIG. 2 circuit.

The operation of the embodiment of the invention depicted in FIG. 2 may best be understood when considered with the timing diagrams of FIGS. 3, representing the timing of the various stages of the averaging performed by the FIG. 2 circuitry when N=1. The waveform i(t) represents an input signal at the mixer 22 output terminal. This signal is sampled at the rate $R_{SAMP}$ and converted to a digital signal in A/D converter 26. The output of the A/D converter $I_k$ is a stream of M bit-wide samples, designated in FIG. 3 by sample numbers 0, 1, 2, 3 . . . . That is, the first sample is designated, 0, the second sample, 1, and so forth. As N=1 in this example, the averaging interval is taken over two samples. Therefore, after the first sample, 0, passes through the accumulator, it is delayed by one sampling period, $T_S$, in the delay 30 as illustrated in the $\Sigma_{k-1}$ timing diagram where $T_S=1/R_{SAMP}$. The delayed first sample coincides in time with the next sample, 1, as can be readily seen from the $I_k$ and $\Sigma_{k-1}$ diagrams. The first sample, 0, is added to the second sample 1 in accumulator 28 as illustrated in timing diagram, $\Sigma_K$ of FIG. 3. Since N=1, $R_{SAMP}/2^N=R_{SAMP}/2$ and therefore, a reset pulse is applied to the delay 30 after the second sample as shown in the Reset diagram of FIG. 3. The output from the delay 30 is thus zero when the third sample, 2, is input to the accumulator. The process continues as illustrated in FIG. 3, with every two samples being added and the delay 30 output being reset to zero after the sum is generated. At the conclusion of the first averaging interval, $1/R_{SAMP}/2$, the sum of the first and second samples passes through the binary point shifter, clocked at $R_{SAMP}/2$ in this example, to produce a signal representing the average value of the sum, $<I_{k/N}>$.

Figure 4:
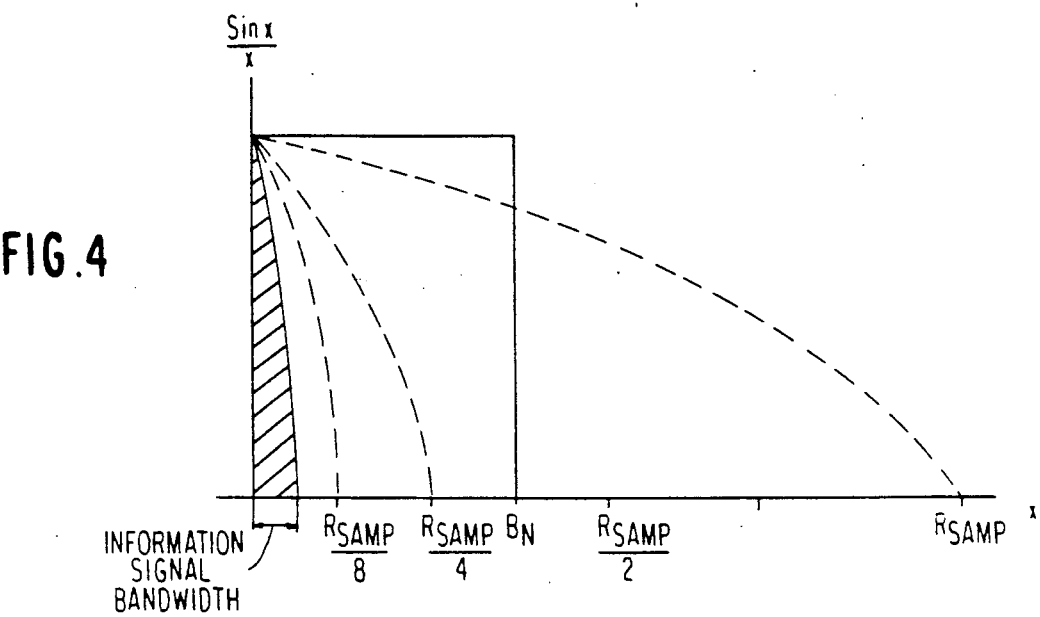
FIG. 4 is a general representation of the sin x/x versus x relationship for an input information signal and the overall signal bandwidth including noise at several sampling rates.

As can be seen from FIG. 3, averaging takes place within a single symbol, thus eliminating the prior art requirement for averaging over several symbols and the need to know the exact symbol period to accomplish the averaging process. Also, as the output sampling rate is lower than the input sampling rate the output bandwidth is narrowed to reduce the noise bandwidth prior to detection. This feature may be understood from FIG. 4 which represents the $\sin x/x$ versus $x$ plot for various sampling rates, $R_{SAMP}/2^N$. The cross-hatched portion represents the information signal bandwidth. $B_N$ is the noise equivalent bandwidth of the IF filter. $R_{SAMP}$, in accordance with conventional sampling theory, is selected to be more than twice $B_N$. As the sampling rate $R_{SAMP}/2^N$ is reduced, the response of the pre-averager represented by the plot approaches the information signal bandwidth, simultaneously reducing the noise bandwidth. Thus, as described above, reducing the output sampling rate according to the teachings of this invention, by averaging the signal samples taken at $R_{SAMP}$, and clocking the averaged samples at the lower rate, $R_{SAMP}/2^N$, reduces the noise bandwidth.

Returning to FIG. 3 and particularly diagram $<I_{k/N}>$, a number of output samples (0+1, 2+3, etc.), equal to one half the number of input samples of the input waveform, each output sample being an average of two input samples, are latched and then may be applied to digital lowpass filter 36 to produce a properly shaped digital baseband output, reduced in noise by the above described averaging process. Note that this filter will operate at a lower sample rate due to the preceding pre-averager and the rate reducing aspect of the invention. The noise reduced digital baseband output is applied to a suitable detector (not shown) for demodulation.

Figure 6:
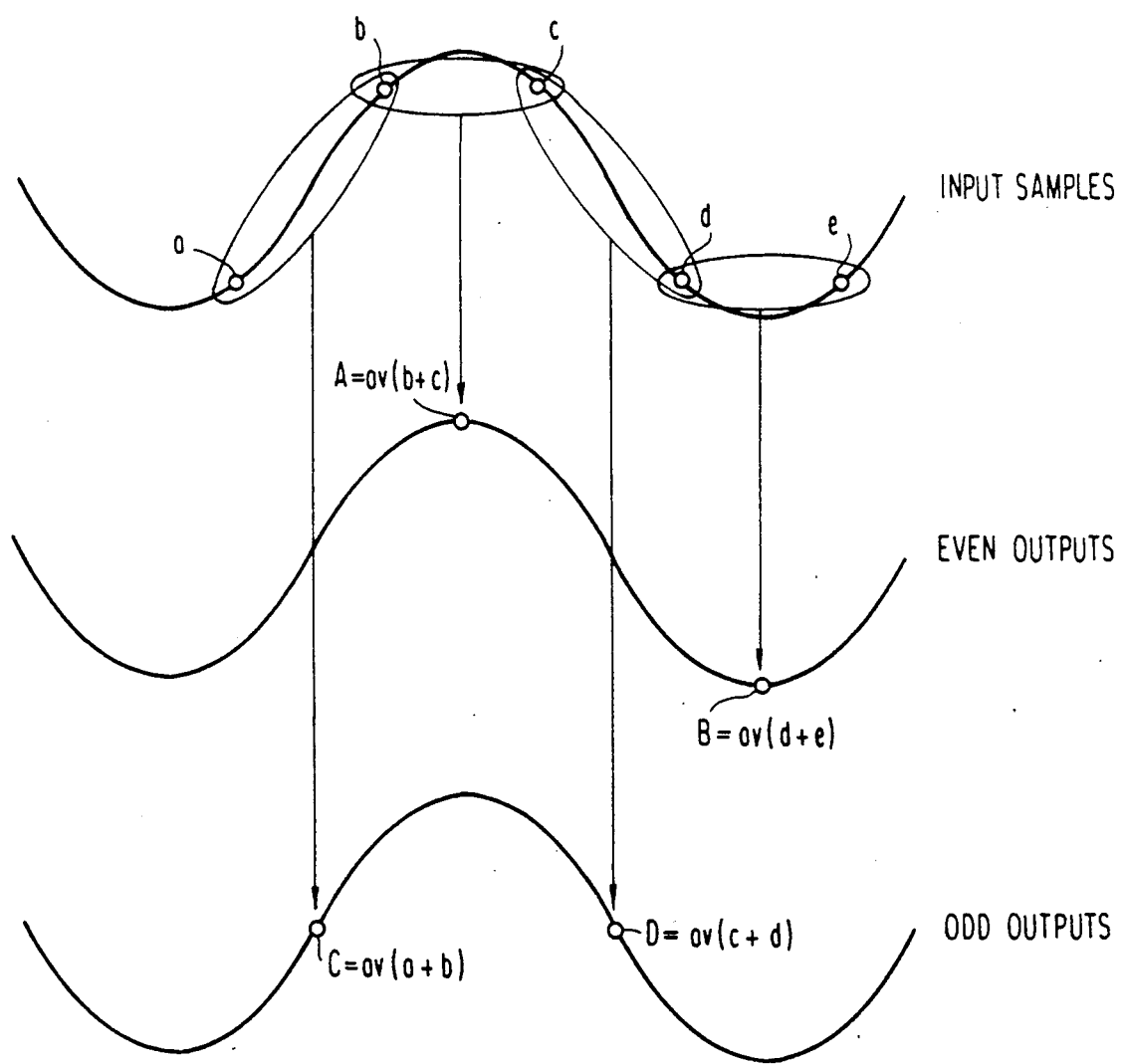
FIG. 6 is a representation of the sampling point offset and sample reuse features incorporated in the pre-averager data filter of FIG. 5.
Figure 7:
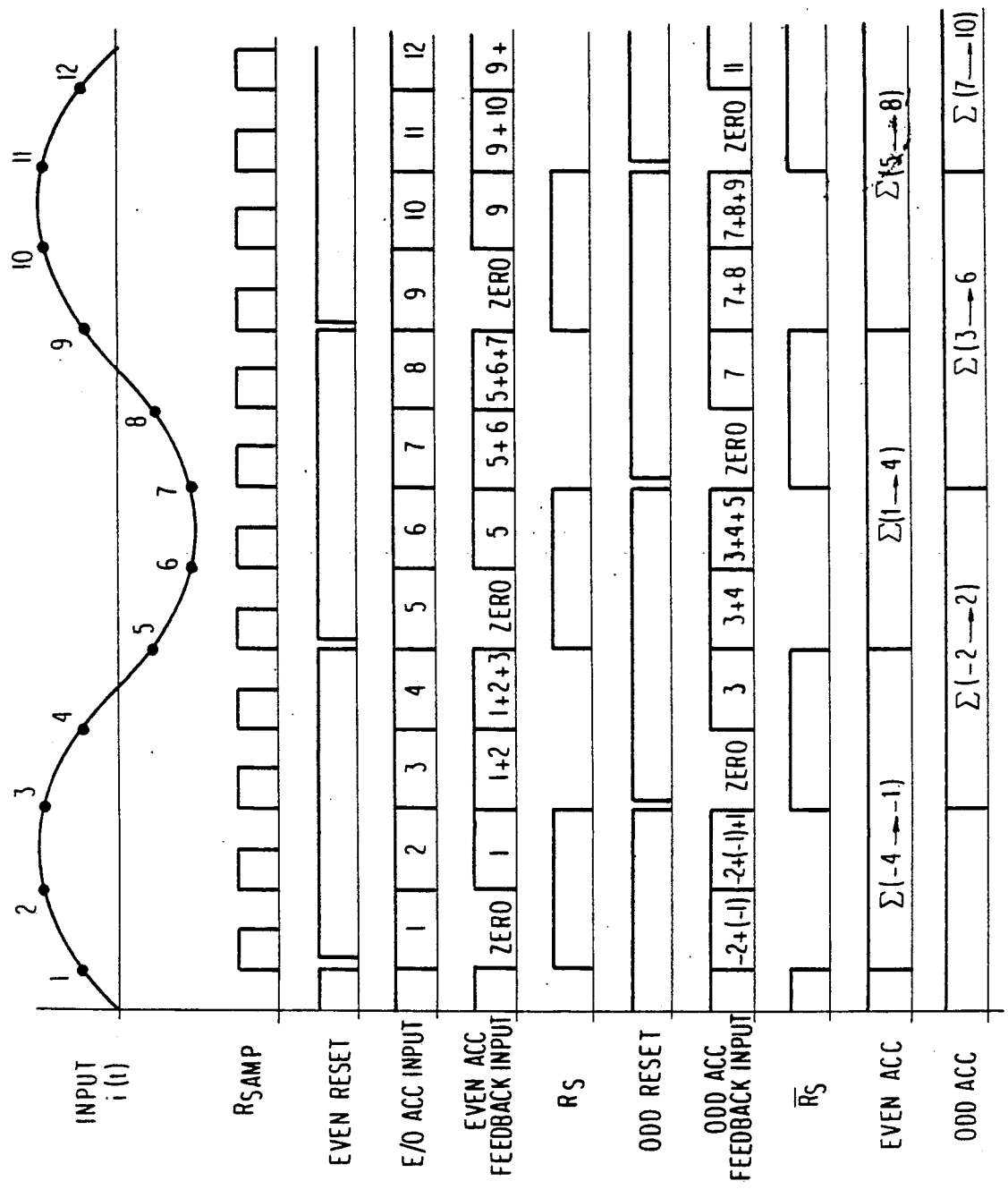
FIG. 7 is a timing diagram for illustrating the operation of the FIG. 5 circuitry.

A second embodiment of the invention will now be discussed with reference to FIGS. 5, 6, and 7. In accordance with this further embodiment, the digital pre-averager described hereinabove is configured as a receive data filter, eliminating the need for a separate data filter following the pre-averager. As discussed previously herein, a data filter in a digital data transmission system should have two fundamental attributes. One, its frequency response should be matched to the transmitted signal spectrum. Two, its combined transmission and reception impulse response should exhibit equally spaced zero crossings. As can be appreciated from a review of FIG. 4, the averaging and reduced sampling rate realized with the preaverager of the invention provides a mechanism by which the frequency response can be substantially matched to the frequency spectrum of the transmitted signal. From FIG. 4 it is seen that as $2^N$ increases, the frequency spectrum of the averaged signal approaches that of the transmitted signal. According to a feature of this invention, a data filter is realized with the pre-averager disclosed herein when averaging occurs over a single symbol and the averaging is effected to produce one output sample per symbol in the detection path. With these criteria implemented by the pre-averager, the preaverager output bandwidth closely approximates that of the transmitted signal. That is, when the pre-averager output is one sample per symbol, the $\sin x/x$ aperture response emulates the receive data filtering operation.

It is to be noted that the pre-averager data filter of the invention has a filter response slightly different from that of a conventional data filter. To compensate for the slightly changed shape of the filter response, predistortion, that is equalization, may be applied at the transmit end. Specifically, the transmit end equalization must compensate for a 0.9dB excess loss at the Nyquist frequency and a softer overall response.

Figure 5:
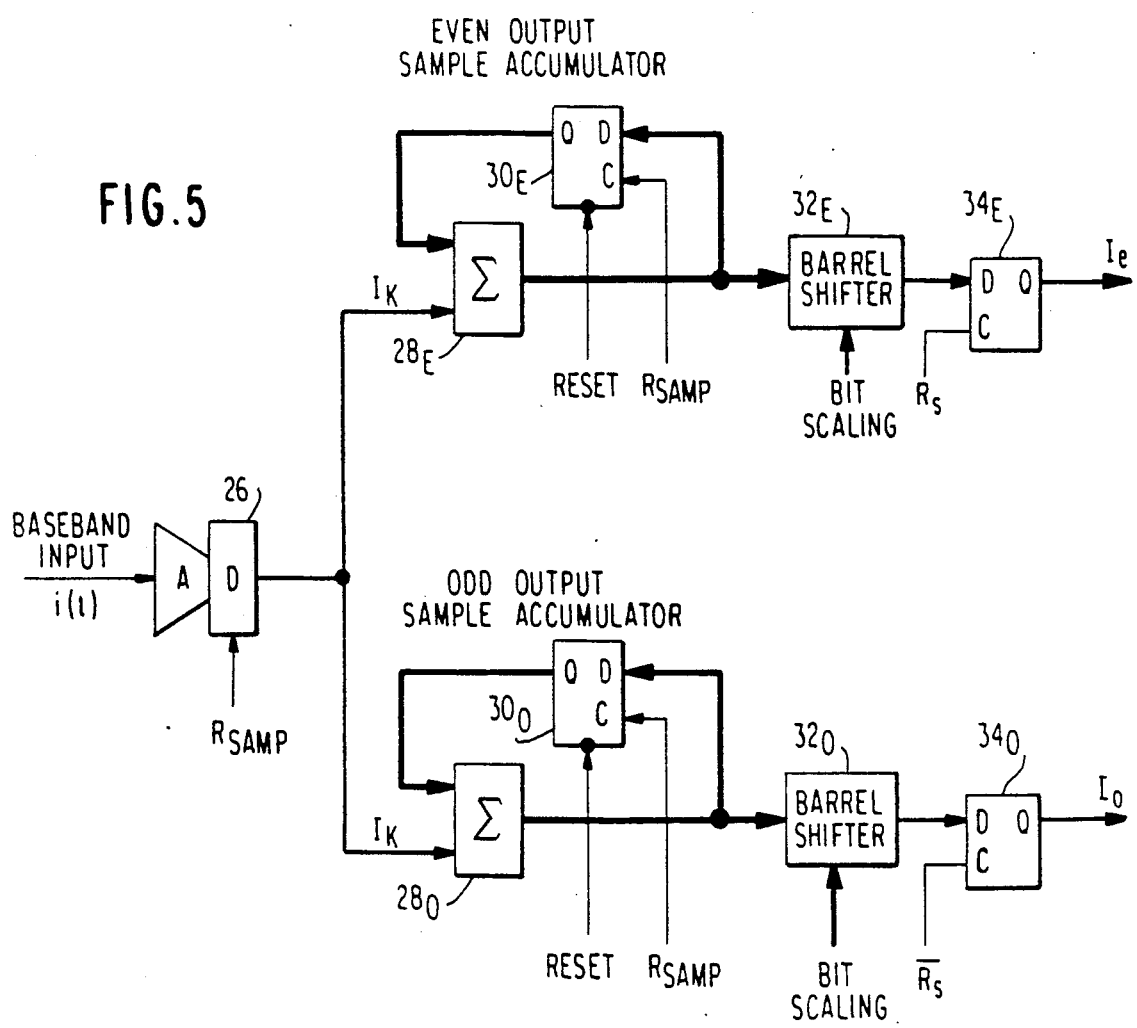
FIG. 5 illustrates a pre-averager data filter according to a second embodiment of the invention.

An embodiment of the data filter according to the second embodiment of the invention is illustrated in FIG. 5. In this arrangement, implemented to detect asynchronous data, the data filter includes two parallel paths. An even or detection sampling point path is for data detection, carrier phase recovery, and AGC estimation. An odd or zero crossing path is for clock recovery. Implementation of the data filter using parallel arranged pre-averagers includes at least the following two novel concepts. First, in averaging down to one sample per symbol and concomittently reducing the bandwidth to the range of a data filter, input samples must be reused. Second, the sampling points of the incoming data must be offset to provide properly centered samples to avoid attendant performance loss resulting from distortion in the averaged output.

Referring to FIG. 5, like elements in FIGS. 2 and 5 are identified by the same reference numeral, with duplications of an element in the same figure identified by subscripted reference numerals. The pre-averager data filter includes an A/D converter 26 receiving baseband signal i(t) and outputting the digitized samples, $I_k$, representing input signal, i(t). The digitized samples are simultaneously applied to the even output sample accumulator and odd output sample accumulator. The even output sample accumulator includes accumulator $28_E$ in the form a summing circuit, a one sample delay $30_E$ in the form of flip-flop circuits, a binary point shifter $32_E$ in the form of a barrel shifter, and latching circuit $34_E$ in the form of flip-flop circuits. The odd output sample accumulator is similarly constituted. Operation of each of the parallel paths is the same as the operation of the circuitry of FIG. 3. However, to obtain the necessary output samples, $I_e$ and $I_o$, for data and clock recovery, sampling points are offset from the ideal sample points at the peaks and zero crossings and samples are reused. This concept of sample reuse will be discussed with reference to FIG. 6 which illustrates sample reuse together with the sampling point offset feature of the invention. The input symbols represent a 1/0 symbol pattern, with FIG. 6, for simplicity, illustrating two input samples per symbol which are to be averaged down to one output sample per symbol in each of the even and odd output paths.

Input samples are taken at offset sampling points a, b, c, d, and e. In the even output sample accumulator, samples b and c are averaged, as are samples d and e. The average A of samples b and c are shown superposed on an imaginary waveform labelled Even Outputs. It is of course understood that average sample A occurs after both samples b and c have occurred and thus the even and odd outputs do not have the phase relationship illustrated in FIG. 6. This figure simply depicts the sampling point offset and sample reuse features of the invention. The average sample B is an average of input samples d and e. Thus, the even path provides one output sample per symbol which uniquely defines the symbol value, 1 or 0.

For detection of asynchronous signals it is necessary to recover the signal clock. Clock recovery by use of the zero crossing samples is achieved using the odd outputs illustrated in FIG. 6. A first zero crossing at output average sample C is generated by averaging input samples a and b. It is to be noted that sample b is used both for the data detection path and the clock recovery path, thus the sample reuse feature of the invention may now be appreciated. A second zero crossing at output average sample D is generated by averaging input samples c and d. In this case, input sample d is reused for the same reason input sample b is reused. In fact, note that all samples are used twice.

It is to be understood that the invention is not limited to the case of only two input samples per symbol, nor is it limited to the use of two parallel paths. In addition, at low data rates it is possible to generate both the data detection and clock recovery samples with a single, shared, hardware path or a microprocessor. In cases where clock recovery is unnecessary, only a single path corresponding to the even output sample accumulator path is required, as only data detection is necessary.

Operation of the pre-averager data filter will now be described in detail with reference to FIGS. 5 and 7. FIG. 7 is a timing diagram showing the operation of the even and odd accumulator paths where four samples per symbol are taken on the input signal i(t). This signal is a typical preamble with alternating 1/0 symbols. That is, in the FIG. 7 example, the input sampling rate $R_{SAMP}$ equals 4 samples per symbol while the output sampling rate $R_S$ equals 1 sample per symbol, $\overline{R_S}$ is the complement of $R_S$.

The digital samples $I_k$ represent the input signal values at points 1-4 of a first symbol, at points 5-8 of a second symbol and 9-12 of a third symbol. The timing of the four samples per symbol are illustrated in timing diagram E/O Acc Input as timing blocks 1-12. In the even path, samples 1, 1+2 and 1+2+3 are fed back to the summing circuit through delay $30_E$ as shown in timing diagram Even Acc Feedback In. The summing circuit sums samples 1, 2, 3, and 4 to produce a summed output as shown in timing diagram Even Acc. After the summing of samples 1-4, an even reset pulse sets the delay $30_E$ to zero to begin the summing process again, this time with samples 5-8. At the same time an output sample pulse $R_s$ rises to clock the summed samples 1-4, scaled in the binary point shifter $32_E$, to the parallel array of latching flip-flips represented by flip-flops $34_E$. The outputs from the latching flip-flops is the signal $I_E$ representing the data value for the symbol corresponding to samples 1-4.

The odd path operates in the manner of the even path except that as a result of the timing differences between $R_S$ and $\overline{R_S}$, and the even reset, Reset, and odd reset, Reset', different input samples are averaged. The odd path, like the even path, receives the samples 1-12. By reason of the timing of the odd reset, Reset', the odd accumulator feedback input receives samples (−2), (−1), and 1 which are summed with sample 2 before the delay $30_o$ is reset to zero by a Reset pulse. Substantially simultaneously with the Reset pulse, the output sampling pulse $\overline{R_S}$ rises to clock the sum of samples (−2), (−1), 1 and 2 into latching circuits $34_o$ after being scaled by binary point shifter $32_o$. This process continues with samples 3-6, and then samples 7-10 as can be appreciated from FIG. 7. As the odd path averages samples 3, 4 from a first symbol with samples 5, 6 of the next symbol the zero crossing sample between symbols is generated. Likewise, averaging of samples 7, 8 of the second symbol with samples 9, 10 of the third symbol generates the zero crossing sample between the second and third symbols.

The invention has been described with reference to preferred embodiments. However, it is to be understood that the invention is not limited to the preferred embodiments. Various modifications apparent to those skilled in the art are within the scope of the invention which is limited only by the appended claims.

We claim:

1. A pre-averager for reducing the noise bandwidth of a modulated signal which has a symbol period which may be variable, prior to signal detection comprising:

analog to digital conversion means for sampling an incoming analog signal at a first sampling rate and to digitize the signal samples;

accumulator means, responsive to said digitized signal samples, for accumulating the digitized samples over a predetermined interval, said predetermined interval being not greater than the symbol period of the signal to be detected, to produce an accumulated sample for the digitized signal samples occurring over said predetermined interval; and means, responsive to said accumulated sample, for outputting said accumulated sample at a second sampling rate.

2. A pre-averager as claimed in claim 1 further including:

means responsive to said accumulative sample at said second sampling rate for producing a digitized signal representative of the average value of the digitized samples over said predetermined interval.

3. A pre-averager as claimed in claim 2 wherein said means for producing a signal representative of an average value comprises a binary point shifter responsive to said accumulated sample for selecting significant bits of said accumulated sample.

4. A pre-averager as claimed in claim 1 wherein said accumulator means comprises, an accumulating circuit and a sample delay circuit for receiving accumulated outputs from said accumulator circuit, said accumulator circuit having a first input for receiving the digitized samples from said analog to digital conversion means and a second input for receiving the output from said sample delay circuit.

said pre-averager further including means for resetting the sample delay circuit after said predetermined interval.

5. In a receiver for receiving a modulated signal which has a symbol period which may be variable, apparatus for reducing the noise bandwidth of the modulated signal prior to signal detection, comprising:

analog to digital conversion means for producing digitized samples of modulated signal at a first sampling rate.

accumulator means, responsive to said digitized samples at said first sampling rate, for accumulating said digitized samples over a predetermined interval, said predetermined internal being not greater than the symbol period of the signal to be detected to produce an accumulated sample representing the sum of the digitized samples over the predetermined interval; and means, responsive to said accumulated sampled for applying signals representative of accumulates samples to a signal detector at a second sampling rate slower than said first sampling rate.

6. An apparatus as claimed in claim 5 wherein said means for applying includes means responsive to said accumulated sample for producing a signal representative of the average of the digitized samples accumulated to produce said accumulated sample.

7. Apparatus as claimed in claim 5 wherein said means for applying includes a binary point shifter for producing selected significant bits of said accumulated sample and latch means for storing said selected significant bits.

8. Apparatus as claimed in claim 5 wherein said modulated signal is a data signal.

9. Apparatus as claimed in claim 5 wherein, said accumulator means comprises an accumulator circuit having first and second inputs, said first input for receiving said digitized samples, and a sample delay circuit for delaying accumulated samples at the output of said accumulator means one sample period at said first sampling rate and for applying said delayed accumulated samples to said second input of said accumulator means.

10. Apparatus as claimed in claim 9 wherein said means for applying includes means for producing a signal representative of an average value of the digitized samples accumulated to produce the accumulated sample.

11. Apparatus as claimed in claim 5 wherein modulated signal received by said analog to digital converter is at baseband, said receiver further including intermediate frequency means responsive to a modulated signal in a frequency band above intermediate frequency for producing a modulated signal at intermediate frequency and means responsive to the modulated signal at intermediate frequency for producing said modulated signal at baseband.

12. Apparatus as claimed in claim 8 wherein said predeetermined interval is substantially one symbol period of said data signal.

13. Apparatus as claimed in claim 6 further including digital lowpass filter means with $sinc^{-1}$ compensation responsive to the output of said means for producing a signal representative of the average of the digitized samples over the predetermined interval.

14. A receive data filter responsive to an analog modulated data signal having a symbol period which may be variable comprising:

analog to digital conversion means for sampling said analog modulated data signal t a first sampling rate and producing digitized samples;

first and second accumulator means each for receiving and accumulating said digitized samples over an interval substantially equal to the symbol period of the data signal to product one accumulated sampler per symbol period and representing the digitized samples occurring over a respective symbol period, and first and second output means each for receiving accumulated samples and outputting signals representative of accumulated samples from a respective first and second accumulator means, said output samples being produced at a second sapling rate slower than said first sampling rate.

15. A receive data filter as claimed in claim 14 wherein said first accumulator means includes a first accumulator circuit having first and second inputs and a first sample delay circuit responsive to accumulated outputs from said first accumulator circuit for delaying said accumulated outputs one sampling rate and applying said delayed accumulated outputs to said second input, said first input of said first accumulator receiving said digitized samples, and said data filter further including first means for resetting said first sample delay circuit after each symbol interval.

16. A receiver data filter as claimed in claim 15 wherein said second accumulator means includes a second accumulator circuit having first and second inputs and a second sample delay circuit responsive to accumulated outputs from said second accumulator circuit for delaying said accumulated outputs one sampling period at said first sampling rate and applying said delayed accumulated outputs to said second input, said second input of said second accumulator receiving said digitized samples, and said data filter further including second means for resetting said second sample delay circuit after receipt of a digitized sample representing symbol value at a point in time half way through the symbol period.

17. A receive data filter as claimed in claim 16 further including means for applying first output clocking signals at said second sampling rate to said first output means and for applying second output clocking signals at said second sampling rate to said second output means, said second output clocking signals being the complement of said first output clocking signal.

18. A receive data filter as claimed in claim 14 wherein said analog to digital conversion means samples said data signal at other than the peaks and zero crossings of the data signal.

19. A method of data filtering for an analog data signal having a symbol interval which may be variable comprising the steps of:

sampling said analog data signal at a first sampling rate to produce a plurality of input samples for each symbol of said analog data signal, each input sample being taken at other than a peak or zero crossing of said analog data signal, digitizing said input samples, simultaneously providing said digitized input samples to first and second detection paths, in the first detection path, averaging he digitized input samples over each symbol interval to produce one even output sample per symbol representing the average of the digitized input samples of the symbol, and in the second detection path, averaging the digitized input samples occurring in a lagging portion of a symbol interval with digitized input samples occurring in a leading portion of the next successive symbol interval to produce one odd output sample representing the average of the digitized input samples occurring during the averaging interval, said one odd output sample providing an indication of a zero crossing between successive symbols.

20. A method of data filtering as claimed in claim 19 wherein said lagging portion of a symbol interval is the lagging half of the symbol interval and said leading portion of a symbol interval is the leading half of the symbol interval.

* * * * *